(12) United States Patent
Norton et al.

(10) Patent No.: US 9,188,041 B2
(45) Date of Patent: Nov. 17, 2015

(54) SYSTEM AND METHOD FOR REDUCING MONO-NITROGEN OXIDE EMISSIONS

(75) Inventors: Daniel George Norton, Niskayuna, NY (US); Edward Joseph Hall, Fairview, PA (US)

(73) Assignee: General Electric Company, Niskayuna, NY (US)

(*) Notice: Subject to any disclaimer, the term of this patent is extended or adjusted under 35 U.S.C. 154(b) by 554 days.

(21) Appl. No.: 13/285,225

(22) Filed: Oct. 31, 2011

(65) Prior Publication Data

US 2013/0104526 A1  May 2, 2013

(51) Int. Cl.
F01N 3/10 (2006.01)
F01N 3/20 (2006.01)
F01N 3/36 (2006.01)
F02M 37/00 (2006.01)
F02D 19/06 (2006.01)

(52) U.S. Cl.
CPC .............. *F01N 3/2066* (2013.01); *F01N 3/36* (2013.01); *F02D 19/0671* (2013.01); *F02M 37/00* (2013.01); *F01N 2610/03* (2013.01); *F02D 19/0647* (2013.01); *F02M 37/0064* (2013.01); *Y02T 10/24* (2013.01)

(58) Field of Classification Search
CPC ..... F01N 3/2066; F01N 3/36; F01N 2610/03; F01N 3/2828; F02M 37/00; Y02T 10/24; B01D 53/90; B01D 53/9418; B01D 2255/30; B01D 2255/104; B01D 2255/2092; B01D 2251/208
USPC .......... 60/272–324; 422/177, 173; 423/213.2; 123/575
See application file for complete search history.

(56) References Cited

U.S. PATENT DOCUMENTS

| | | | |
|---|---|---|---|
| 5,325,838 A * | 7/1994 | Bennett | 123/527 |
| 7,435,760 B2 | 10/2008 | Herling et al. | |
| 7,484,358 B2 | 2/2009 | Cho et al. | |
| 7,802,423 B2 | 9/2010 | Frydman et al. | |
| 7,879,295 B2 | 2/2011 | Liu et al. | |
| 2002/0029564 A1* | 3/2002 | Roth et al. | 60/286 |
| 2007/0048204 A1 | 3/2007 | Mital | |
| 2008/0098728 A1 | 5/2008 | Winkler et al. | |
| 2009/0173061 A1* | 7/2009 | Vitse et al. | 60/287 |
| 2009/0255236 A1 | 10/2009 | Collier et al. | |
| 2010/0140137 A1 | 6/2010 | Deluga et al. | |
| 2010/0146947 A1 | 6/2010 | Liu et al. | |
| 2010/0205935 A1 | 8/2010 | Houel et al. | |
| 2011/0209467 A1* | 9/2011 | Perry et al. | 60/303 |
| 2011/0239622 A1* | 10/2011 | Hancu et al. | 60/274 |
| 2012/0107207 A1* | 5/2012 | Winkler et al. | 423/239.1 |

* cited by examiner

*Primary Examiner* — Audrey K Bradley
*Assistant Examiner* — Kelsey Stanek
(74) *Attorney, Agent, or Firm* — Joseph J. Christian

(57) ABSTRACT

A system for reducing emissions in an engine is provided. The system includes a primary fuel tank having a primary fuel. The system also includes a secondary fuel tank having a secondary fuel. The system further includes a separator in fluid communication with the secondary fuel tank or the primary fuel tank or both the secondary fuel tank and the primary fuel tank, the engine and a hydrocarbon-selective catalytic reduction subsystem. The subsystem separator separates a less volatile portion of the secondary fuel or the primary fuel from a more volatile portion, said less volatile portion of the secondary fuel or the primary fuel in the separator is routed to the hydrocarbon-selective catalytic reduction subsystem and said more volatile portion of the secondary fuel or the primary fuel in the separator is routed to the engine.

16 Claims, 3 Drawing Sheets

SYSTEM AND METHOD FOR REDUCING MONO-NITROGEN OXIDE EMISSIONS

BACKGROUND

The invention relates generally to system and method of reducing emissions and more particularly to a system and method for reducing mono-nitrogen oxides ($NO_x$) emissions.

Typically, various combustion sources such as locomotives, vehicles, power plants, and the like, has resulted in environmental pollution due to production of emissions. One particular type of such emissions is $NO_x$. Environmental legislation restricts the amount of $NO_x$ that can be emitted by vehicles. In order to comply with this legislation, efforts have been directed at reducing the amount of $NO_x$ emissions. One method of emission reduction is directed to reducing the amount of $NO_x$ emissions produced during the process of combustion in engines. This method generally involves redesigning engines to optimize the combustion of fuel. This approach has resulted in the reduction of $NO_x$ over the years; however, it is often expensive. Further, engines can be tuned to emit less $NO_x$ emissions, but this is usually at the expense of increased fuel consumption. Another method is directed to using urea based selective catalytic reduction (SCR) for reducing $NO_x$ emissions. In this method, a solution of ammonia or urea contacts the exhaust stream of the combustion source to reduce the $NO_x$ to nitrogen, over a SCR catalyst, water and carbon dioxide (if urea is used). This method is disadvantageous as ammonia or urea is toxic and is required to be maintained at sufficient levels for $NO_x$ reduction during transportation. Further urea may also be unavailable at all areas and may also be expensive.

Accordingly, there is an ongoing need for improving upon systems and methods that provide reductants in hydrocarbon based selective catalytic reduction (HC-SCR) systems for reduced $NO_x$ emissions

BRIEF DESCRIPTION

In accordance with an embodiment of the invention, a system for reducing emissions in an engine is provided. The system includes a primary fuel tank having a primary fuel. The system also includes a secondary fuel tank having a secondary fuel. The system further includes a separator in fluid communication with the secondary fuel tank or the primary fuel tank or both the secondary fuel tank and the primary fuel tank, the engine and a hydrocarbon-selective catalytic reduction subsystem via a reductant injector. The subsystem separator separates a less volatile portion of the secondary fuel or the primary fuel from a more volatile portion, said less volatile portion of the secondary fuel or the primary fuel in the separator is routed to the hydrocarbon-selective catalytic reduction subsystem and said more volatile portion of the secondary fuel or the primary fuel in the separator is routed to the engine.

In accordance with an embodiment of the invention a system for reducing emissions in an engine. The system includes a primary fuel tank having a primary fuel. The system also includes a secondary fuel tank having a secondary fuel. The system further includes a separator in fluid communication with the secondary fuel tank, the primary fuel tank, the engine and a hydrocarbon-selective catalytic reduction subsystem via a reductant injector. The separator is configured to separate the primary fuel and the secondary fuel into a less volatile portion, a medium volatile portion and a more volatile portion such that the medium volatile portion is routed to the reductant injector and both the more volatile portion and the less volatile portion is routed to the engine.

In accordance with an embodiment of the invention a method for reducing emissions in an engine is provided. The method includes providing a primary fuel and a secondary fuel to the engine. The method also includes directing the secondary fuel or the primary fuel or both the secondary fuel and the primary fuel to a separator. The method further includes separating a less volatile portion of the secondary fuel or the primary fuel or a mixture of both the primary fuel and the secondary fuel from a more volatile portion. The method also includes directing the more volatile portion to the engine for combustion and directing the less volatile portion to a hydrocarbon-selective catalytic reduction subsystem via a reductant injector for reaction with exhaust gases of the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
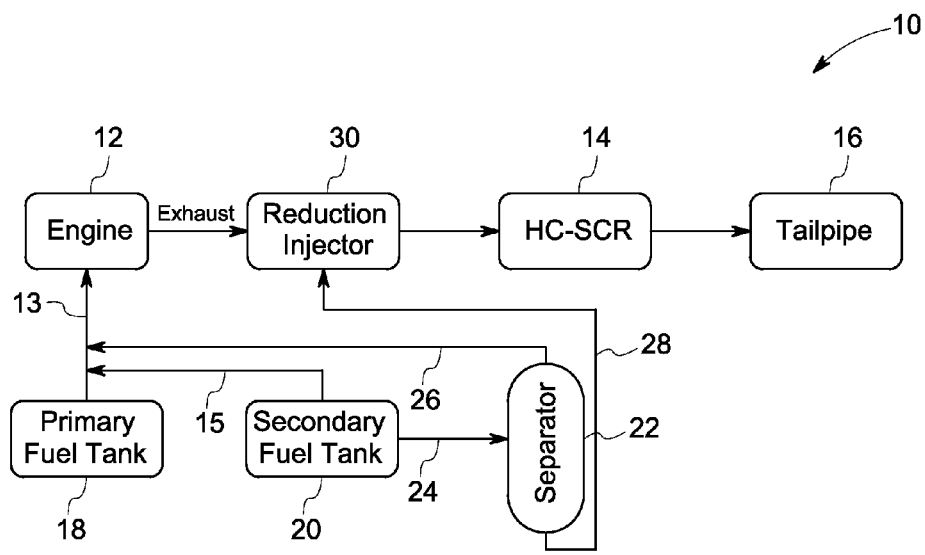
FIG. 1 is a block diagram of a system for reducing emissions in an engine in accordance with an embodiment of the present invention.

FIG. 1 is a representation of a system 10 for reducing emissions in an engine 12 in accordance with an embodiment of the invention. In one embodiment, the system 10 is used to abate $NO_x$ emissions from the engine 12. The system 10 includes a hydrocarbon based selective catalytic reduction (HC-SCR) subsystem 14 located before a tailpipe 16 used for releasing exhaust gases with reduced content of $NO_x$. The reduction of $NO_x$ happens due to reaction of the excess $NO_x$ with selected hydrocarbons in the HC-SCR subsystem 14 thereby, resulting in formation of nitrogen, carbon-dioxide and water. In one embodiment, the system 10 includes a primary fuel tank 18 for supplying a primary fuel to the engine 12 through a fluid communication 13. Non-limiting example of the primary fuel includes a diesel. In one embodiment, the system 10 also includes a secondary fuel tank 20 for supplying a secondary fuel to the engine 12 through a fluid communication 15. Non-limiting example of the secondary fuel includes liquefied hydrocarbons stored under pressure or stored cryogenically such as liquefied petroleum gas (LPG) or liquefied natural gas (LNG). These liquefied hydrocarbon fuels contain mixture of species, out of which the less volatile species such as propane, butane or pentane are more effective reductants as the less volatile species readily react with $NO_x$. The system 10 includes a separator 22 in fluid communication 24 with the secondary fuel tank 20, wherein the separator 22 is configured to separate the less volatile components of the secondary fuel from the more volatile components of the secondary fuel by application of reduced pressure or heat. In a non-limiting example, the separator 22 may be configured for distillation or flashing for separating the components of the secondary or primary fuel. In one embodiment, the separator 22 is a membrane separation unit. Non-limiting examples of the membrane in the membrane separation unit includes reverse osmosis (RO) membranes, nanofiltration membranes, microfiltration membranes, electrodialysis membranes or hydrophilic membranes. In one embodiment, the separator 22 is a two stage separator. The secondary fuel is continuously pumped into the separator 22 through the fluid communication 24. Since the separator 22 is maintained at a higher temperature or lower pressure or both at higher temperature and lower pressure as compared to the secondary fuel tank 20, this results in partial flashing of the secondary fuel within the separator 22. Either of the low pressure or heat or both the low pressure and heat causes vaporization of a portion of the secondary fuel in the separator 22, especially the more volatile components are vaporized during flashing and occupy the top portion of the separator 22.

In this embodiment, the separator 22 is in fluid communication 26 with the engine 12 and further in fluid communication 28 with a reductant injector 30. As shown, the fluid communication 26 is connected to the top portion of the separator 22 for routing the more volatile components to the engine 12 for combustion. The fluid communication 28 directs the less volatile components of the secondary fuel in the separator 22 to the reductant injector 30. Further, the secondary fuel level in the separator 22 is maintained at an optimal level by controlling either the pressure and temperature within the separator 22, or the feed rate to the separator 22. In one embodiment, the performance of the separator 22 that includes the membrane separation unit is controlled using pressure differential across the membrane. In one embodiment, the fluid communication 28 is operated at a low pressure to vaporize the less volatile components of the secondary fuel contained in the separator 22. Further, the less volatile components of the secondary fuel are eventually injected into the HC-SCR subsystem 14 by the reductant injector 30. The exhaust gas from the engine 12 is also routed through the reductant injector 30 into the HC-SCR subsystem 14 and finally into the tailpipe 16 for further discharge in the atmosphere with reduced $NO_x$ emissions. The less volatile components of the secondary fuel react with the $NO_x$ contained in exhaust gases in the HC-SCR subsystem 14, thus the $NO_x$ content in the exhaust gases is reduced.

Figure 2:
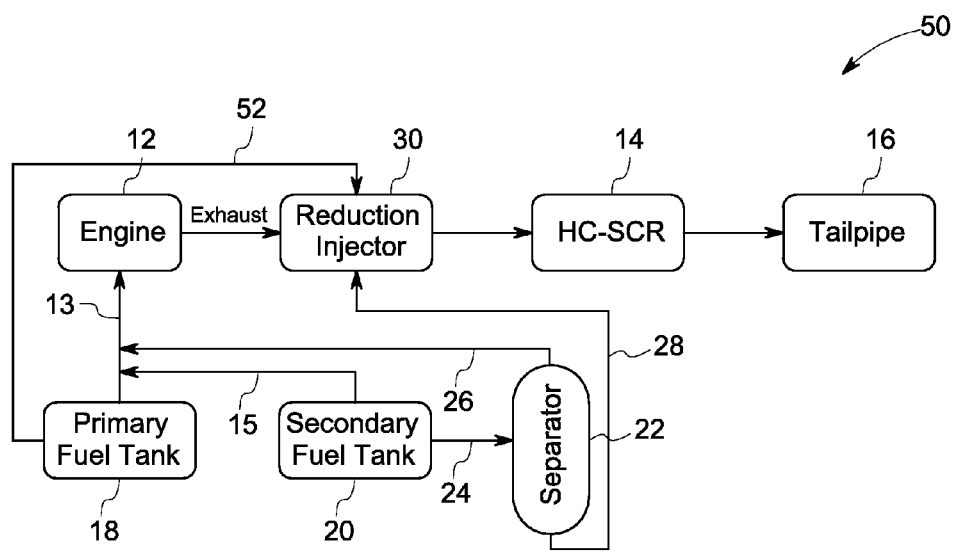
FIG. 2 is a block diagram of a system for reducing emissions in an engine in accordance with a second embodiment of the present invention.

FIG. 2 is a block diagram of a system 50 for reducing emissions in accordance with a second embodiment of the present invention. In this embodiment, the system 50 includes a fluid communication 52 between the primary fuel tank 18 and the reductant injector 30 for routing the more volatile portion of the primary fuel to the reductant injector 30. In one embodiment, the more volatile portion of the primary fuel may include property of medium reductants and therefore used in the HC-SCR subsystem 14 for reacting with $NO_x$. Non-limiting examples of the primary fuel may include a diesel or petrol/gasoline. The other features of the system 50 are similar to the system 10 as discussed for FIG. 1.

Figure 3:
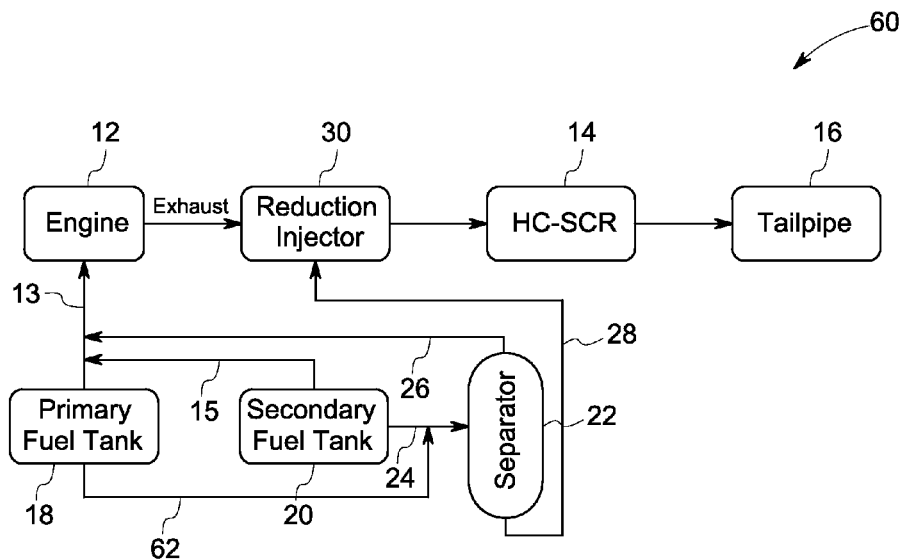
FIG. 3 is a block diagram of a system for reducing emissions in an engine in accordance with a third embodiment of the present invention.

FIG. 3 is a block diagram of a system 60 for reducing emissions in accordance with a third embodiment of the present invention. In this embodiment, the system 60 includes a fluid communication 62 for routing a portion of the primary fuel to the fluid communication 24 that connects the secondary fuel tank 20 and the separator 22. The portion of the primary fuel is then led into the separator 22. In this embodiment, the separator 22 is configured to separate the mixture of the primary and the secondary fuel into less volatile components and the more volatile components. The less volatile components are routed to the reductant injector 30 through fluid communication 28 whereas the more volatile components are directed to the engine 12 through the fluid communication 26. The other features of the system 50 are similar to the system 10 as discussed for FIG. 1.

Figure 4:
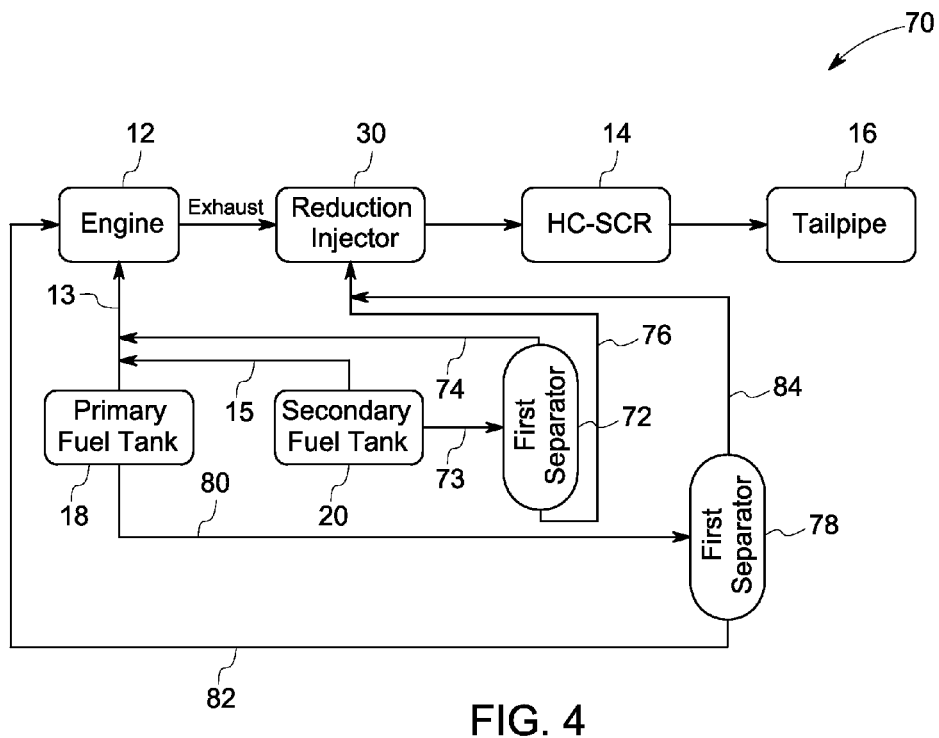
FIG. 4 is a block diagram of a system for reducing emissions in an engine in accordance with a fourth embodiment of the present invention.

FIG. 4 is a block diagram of a system 70 for reducing emissions in accordance with a fourth embodiment of the present invention. The system 70 includes a first separator 72 in fluid communication 73 with the secondary fuel tank 20. The first separator 72 is also in fluid communication 74 with the engine 12 for routing the more volatile components of the secondary fuel to the engine 12. The less volatile components in the first separator 72 are routed through a fluid communication 76 to the reductant injector 30. The system 70 also includes a second separator 78 in fluid communication 80 with the primary fuel tank 18 for receiving the primary fuel. The second separator 78 is also in fluid communication 82 with the engine 12 for routing the less volatile components of the primary fuel to the engine 12. The more volatile components at the top of the second separator 78 are routed through a fluid communication 84 to the reductant injector 30. The other features of the system 70 are similar to the system 10 as discussed for FIG. 1.

Figure 5:
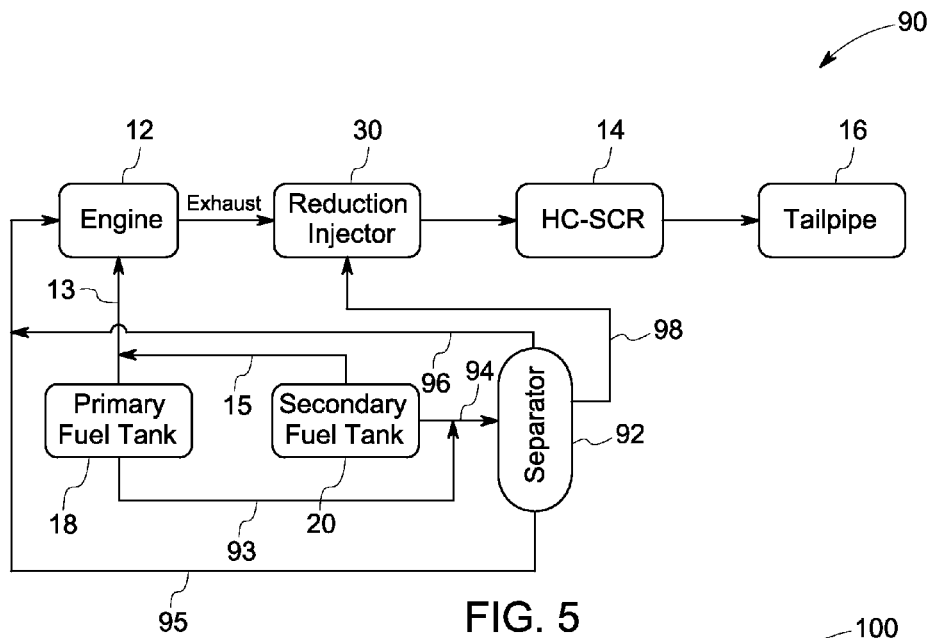
FIG. 5 is a block diagram of a system for reducing emissions in an engine in accordance with a fifth embodiment of the present invention.

FIG. 5 is a block diagram of a system 90 for reducing emissions in accordance with a fifth embodiment of the present invention. The system 90 includes a separator 92 in fluid communications 93 and 94 with the primary fuel tank 18 and the secondary fuel tank 20 respectively for receiving the primary and secondary fuels. The separator 92 is configured to utilize heat or low pressure or both heat and low pressure to separate the mixture of the primary fuel and the secondary fuel into three categories of components including the less volatile components occupying the lower portion of the separator 92, the medium volatile components occupying the middle portion of the separator 92 and the more volatile components occupying the top portion of the separator 92. The less volatile components and the more volatile components are routed to the engine 12 through fluid communications 95 and 96 respectively, whereas the medium volatile components are routed to the reductant injector 30 through fluid communication 98. The medium volatile components may act as reductants supplied to the HC-SCR subsystem 14 via the reductant injector 30. The other features of the system 70 are similar to the system 10 as discussed for FIG. 1.

Figure 6:
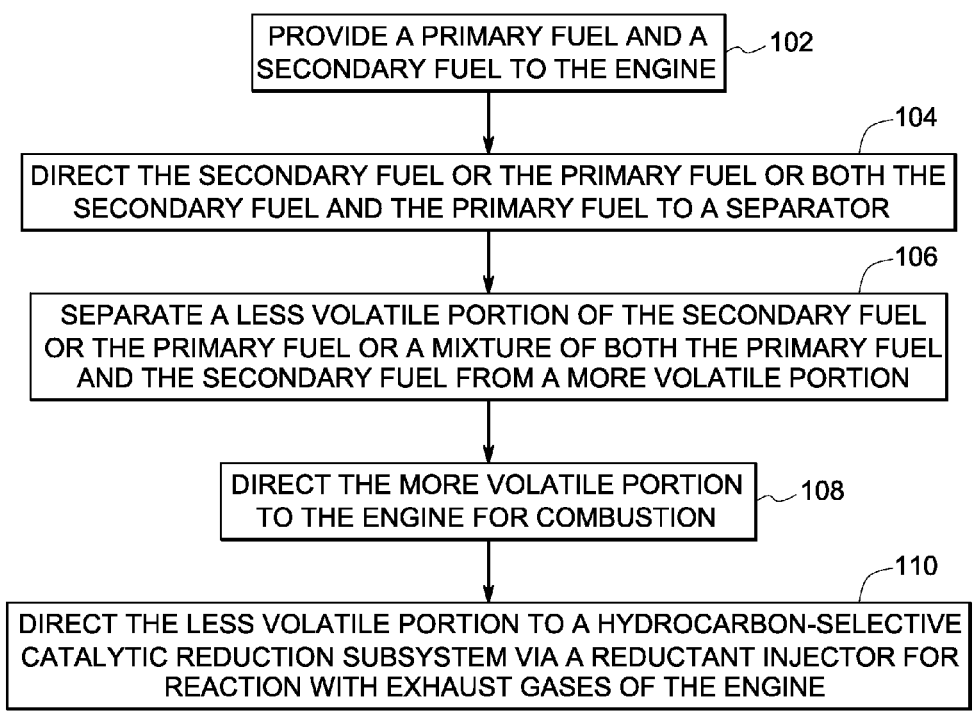
FIG. 6 shows a flow chart of a method of reducing emissions in an engine in accordance with an embodiment of the present invention.

FIG. 6 shows a flow chart of a method 100 of reducing emissions in an engine in accordance with an embodiment of the present invention. At step 102, the method 100 includes providing a primary fuel and a secondary fuel to the engine. In one embodiment, the method includes providing a first portion of the primary fuel to the engine and a second portion of the primary fuel to a reductant injector. The method 100 further includes directing the secondary fuel or the primary fuel or both the secondary fuel and the primary fuel to a separator at step 104. In another embodiment, the method 100 includes directing a portion of the secondary fuel to a first stage separator and directing a portion of the primary fuel to a second stage separator, such that a more volatile portion of the primary fuel in the second stage separator is directed to the reductant injector and a less volatile portion of the primary fuel in the second stage separator is directed to the engine. In this embodiment, the method 100 also includes directing a more volatile portion of the secondary fuel of the first stage separator to the engine and directing a less volatile portion of the secondary fuel of the first stage separator to the reductant injector. At step 106, the method 100 separating a less volatile portion of the secondary fuel or the primary fuel or a mixture of both the primary fuel and the secondary fuel from a more volatile portion in a separator. At step 108, the method 100 includes directing the more volatile portion to the engine for combustion. In one embodiment, the method 100 includes separating the mixture of both the primary and the secondary fuel into a less volatile portion, a medium volatile portion and a more volatile portion, such that the medium volatile portion is routed to the reductant injector and both the more volatile portion and the less volatile portion is routed to the engine. Finally, the method 100 includes directing the less volatile portion to a hydrocarbon-selective catalytic reduction subsystem via a reductant injector for reaction with exhaust gases of the engine at step 110.

Advantageously, the present system and method enables reduction of $NO_x$ emissions by use of reductants which are less volatile components of liquefied hydrocarbons such as LPG and LNG in hydrocarbon based selective catalytic reduction (HC-SCR) systems. The present system and method is also cost effective as there is lower total fuel utilization. Further, the system and method also utilizes the more volatile components of diesel fuels as reductants in the HC-SCR systems for reducing emissions.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for reducing emissions in an engine, the system comprising:
 a primary fuel tank having one of diesel or gasoline;
 a secondary fuel tank having liquefied natural gas (LNG); and
 a separator in fluid communication with the secondary fuel tank, the engine, and a hydrocarbon-selective catalytic reduction subsystem via a reductant injector, wherein the primary fuel tank is in fluid communication with the engine and the reductant injector such that a more volatile portion of the diesel or a more volatile portion of the gasoline is routed to the reductant injector;
 wherein the separator separates a less volatile portion of the LNG from a more volatile portion of the LNG, said less volatile portion of the LNG in the separator is routed to the hydrocarbon-selective catalytic reduction subsystem and said more volatile portion of the LNG in the separator is routed to the engine.

2. The system of claim 1, wherein the primary fuel tank is in fluid communication with the engine.

3. The system of claim 1, wherein the primary fuel tank is in fluid communication with the engine and the separator.

4. The system of claim 1, wherein the fluid communication between the separator and the reductant injector is operated at a low pressure or high temperature to vaporize the fuel contained in the separator.

5. The system of claim 1, wherein the more volatile portion of the diesel or the more volatile portion of gasoline is used as a medium reductant in the hydrocarbon-selective catalytic reduction subsystem.

6. The system of claim 1, wherein the separator is a vaporization vessel operated at a high temperature or low pressure or simultaneously at a high temperature and low pressure compared to the secondary fuel tank or the primary fuel tank.

7. The system of claim 1, wherein the separator is a membrane separation unit comprising one of reverse osmosis (RO) membranes, nanofiltration membranes, microfiltration membranes, electrodialysis membranes or hydrophilic membranes.

8. The system of claim 7, wherein the membrane separation unit is controlled using pressure differential across the membrane.

9. The system of claim 1, wherein the secondary fuel tank and the separator is operated at high pressure.

10. The system of claim 1, wherein the separator is a two stage separator comprising a first stage separator and a second stage separator.

11. The system of claim 10, wherein the first stage separator is in fluid communication with the secondary fuel tank, the engine and the reductant injector such that more volatile portion of the secondary fuel in the first stage separator is routed to the engine and the less volatile portion of the secondary fuel in the first stage separator is routed to the reductant injector.

12. The system of claim 10, wherein the second stage separator is in fluid communication with the primary fuel tank, the engine and the reductant injector such that more volatile portion of the primary fuel in the separator is routed the reductant injector and the less volatile portion of the primary fuel in the separator is routed to engine.

13. A method for reducing emissions in an engine, the method comprising:
 directing liquefied natural gas (LNG) to a separator;
 separating a less volatile portion of the LNG, from a more volatile portion in the separator;
 directing the more volatile portion of the LNG from the separator to the engine for combustion;
 directing the less volatile portion of the LNG from the separator to a hydrocarbon-selective catalytic reduction subsystem via a reductant injector for reaction with exhaust gases of the engine; and
 directing a less volatile portion of diesel or gasoline to the engine and a more volatile portion of the diesel or gasoline to the reductant injector.

14. The method of claim 13, further comprising directing a portion of the secondary fuel to a first stage separator and directing a portion of the primary fuel to a second stage separator, such that a more volatile portion of the primary fuel in the second stage separator is directed to the reductant injector and a less volatile portion of the primary fuel in the second stage separator is directed to the engine.

15. The method of claim 14, further comprising directing a more volatile portion of the secondary fuel of the first stage separator to the engine and directing a less volatile portion of the secondary fuel of the first stage separator to the reductant injector.

16. The method of claim 13, further comprising separating the mixture of both the primary and the secondary fuel into a less volatile portion, a medium volatile portion and a more volatile portion, such that the medium volatile portion is routed to the reductant injector and both the more volatile portion and the less volatile portion is routed to the engine.

* * * * *